United States Patent

[11] 3,617,419

| [72] | Inventors | Joseph Fischer<br>Urbana;<br>Thomas E. Haddock, Atwood, both of Ill. |
|---|---|---|
| [21] | Appl. No. | 797,266 |
| [22] | Filed | Feb. 6, 1969 |
| [45] | Patented | Nov. 2, 1971 |
| [73] | Assignee | National Distillers and Chemical Corporation<br>New York, N.Y. |

[54] ADHESIVE AND METHOD FOR BONDING CROSS LINKED POLYOLEFINS AND OTHER POLYMERIC MATERIAL
4 Claims, No Drawings

[52] U.S. Cl. .................................................. 156/332, 156/334, 161/247, 161/252, 161/254
[51] Int. Cl. ........................................................ B32b 27/08, C09j 3/14

[50] Field of Search ............................................. 260/32.8; 156/308, 313, 334, 332; 161/254

[56] References Cited
UNITED STATES PATENTS

| 2,628,214 | 2/1953 | Pinkney et al. | 260/23 |
| 2,888,424 | 5/1959 | Precopio et al. | 260/41 |
| 3,214,422 | 10/1965 | Mageli et al. | 260/94.9 |

Primary Examiner—Morris Liebman
Assistant Examiner—J. H. Derrington
Attorney—Allen A. Meyer, Jr.

ABSTRACT: An adhesive comprising an ethylene-vinyl acetate copolymer, an organic solvent and a cross-linking agent and a method of bonding comprising coating at least one surface to be bonded, contacting the surfaces under pressure and heating.

ADHESIVE AND METHOD FOR BONDING CROSS LINKED POLYOLEFINS AND OTHER POLYMERIC MATERIAL

BACKGROUND OF THE INVENTION

Recently, cross-linked polyolefin resins have come into wide use due to their desirable properties of improved temperature, chemical and solvent resistance as compared to non-cross-linked resins. Their high degree of temperature, chemical, and solvent resistance, however, renders it extremely difficult to bond these resins to each other and to other materials using conventional adhesives and bonding methods. For example, it has previously been proposed to bond polyolefin resins and other resinous materials utilizing various waxes and synthetic resin containing waxes as adhesives. Although these adhesives give reasonably good bonds between noncross-linked resins, when it is attempted to bond cross-linked polyolefins, utilizing these waxy adhesives, unsatisfactory bonds result.

BRIEF DESCRIPTION OF THE INVENTION

It is an object of the present invention to provide an adhesive suitable for bonding polymeric materials.

It is a further object of the present invention to provide an adhesive particularly suited for bonding cross-linked polymeric materials.

It is a further object of the present invention to provide an adhesive specifically adapted for bonding cross-linked polyolefin materials to each other and to other materials.

It is a further object of the present invention to provide a method for bonding polymeric materials, particularly cross-linked polyolefin materials to each other and to other materials.

According to the present invention excellent bonds may be obtained between polymeric materials, and in particular, cross-linked polymeric materials, utilizing an adhesive comprising an organic solvent containing an ethylene-vinyl acetate copolymer and a cross-linking agent.

Further, according to the method of the present invention, excellent bonds between polymeric materials may be obtained by coating at least one of the surfaces to be bonded with the adhesive of the present invention, contacting the surfaces under sufficient pressure to ensure intimate contact therebetween and heating the coating to remove the solvent and cure the adhesive.

DETAILED DESCRIPTION OF THE INVENTION

As hereinbefore indicated, the adhesive of the present invention is applicable to bond any type of polymeric materials, but is particularly effective for bonding cross-linked polyolefins to themselves and to other polymeric materials.

Suitable materials which may be bonded according to the present invention include those prepared from such polymers as polyethylene, atactic polypropylene, isotactic polypropylene, polybutylene and copolymers thereof. Monomers with which some of the above material may be copolymerized include, for example, vinyl acetate, styrene, butadiene, acrylonitrile, etc. Particularly applicable, however, are the normally difficulty bonded polymers, i.e., cross-linked polyolefins, especially cross-linked polyethylene and polypropylene. It is to be understood that by the term, polyolefin, is meant homopolymer and copolymers of olefins. It is also to be understood that the present invention is applicable to the bonding of polymeric substrates to nonpolymeric materials as well as to other polymeric materials. Thus, the polymeric materials may be bonded to paper, wood, regenerated cellulosic articles, etc.

The ethylene-vinyl acetate copolymers employed to formulate the adhesives according to the present invention may be prepared according to the method disclosed in U.S. Pat. No. 2,200,429. Generally, the copolymer is obtained by heating a mixture of ethylene and vinyl acetate in the presence of a free radical catalyst at pressures from 15,000–30,000 p.s.i.g. and at temperatures of from 150°–250° C. The copolymer should have a density of between 0.935 and 1.1 g./cc. Generally, the copolymer should contain between 15 percent and 55 percent vinyl acetate and should have a melt index of less than 50 g./10 min., preferably less than 5 g./10 min. It should be noted that any ethylene-vinyl acetate copolymer is operable to yield an adhesive having improved bonding strengths over the conventional adhesives heretofore employed; however, those copolymers having properties within the above-noted ranges provide the most desirable adhesives.

Generally, any organic solvent for ethylene-vinyl acetate copolymers which has no deleterious effect on the polymeric materials to be bonded with the adhesive, may be employed. Xylene is the preferred solvent because of the high degree of solubility of ethylene-vinyl acetate copolymers therein and its low cost. Other suitable solvents include aromatic hydrocarbons such as toluene, benzene, etc., ketones such as methyl ethyl ketone, acetone, etc. esters such as ethyl and butyl acetate, etc.; and chlorinated hydrocarbons such as tri-chloro and tetra-chloro ethylene, may also be utilized.

It is also within the scope of the invention to include in the solvent a diluent which, although having no solvating effect on the adhesive, acts to extend the primary solvent.

The concentration of ethylene-vinyl acetate copolymer in the mixture will depend on the particular solvent employed. Obviously, highly concentrated solutions may present problems of application due to their high viscosities. Extremely low concentrations will not contain sufficient copolymer to achieve a sufficiently strong bond. Normally, concentrations of ethylene-vinyl acetate copolymer between 5 percent and 40 percent of the total formulation may be employed, based on the solvent.

Generally, any of the conventionally employed cross-linking agents may be incorporated in the adhesives of the present invention. Illustrative of these cross-linking agents are organic peroxide compounds such as:

2, 5-dimethyl-2,5 bis(t-butylperoxy) hexane
Dicumyl peroxide
2,5-Dimethyl 2,5-bis(t-butylperoxy) hexyne-3
2,5-Dimethyl-2,5-bis(isopropoxycarbonyl-peroxy)hexyne-3
bis(t-butylperoxy) diphenyl silane
2,5-Dimethyl-di(t-butylperoxy) hexyne-3.

The cross-linking agents are normally included in the adhesive composition in small amounts, generally, from about 0.25 to about 5.0 percent based on the weight of resin.

In a preferred embodiment, the adhesive composition comprises from about 10 to about 15 percent ethylene-vinyl acetate copolymer (having a melt index of 3.67 g./10 min., a density of 0.9542 g./cc., and containing about 30.1 percent vinyl acetate) and 1 percent of dicumyl peroxide, in xylene.

According to the method of the present invention, the adhesive composition may be applied by brushing, roller coating, dipping, etc., on one or more of the surfaces to be bonded. Preferably, the applied coatings are allowed to dry at ambient temperatures to a nontacky state. The surfaces to be bonded are then contacted under sufficient pressure to ensure intimate contact therebetween. It is to be understood, however, that the preferred intermediate drying step may be omitted and the surfaces contacted immediately after applying the adhesive coating. The coating or coatings are then heated to a temperature sufficient to remove the solvent and cure the adhesive bond. The heating temperature will depend upon the particular solvent employed and on the nature of the polymeric materials to which the adhesive is applied. Obviously, it will only be necessary to employ a temperature sufficiently high to volatilize the solvent and to cure the ethylene-vinyl acetate-cross-linking agent composition. When employing xylene as a solvent, temperatures of between 350° and 400° F., will yield good bonds in less than 5 minutes.

Although it is preferred to coat all of the surfaces which are to be bonded together in order to obtain the strongest bond, it should be understood that only one of the surfaces to be bonded may be coated prior to contact and heating.

The pressure applied during the contacting step is not critical. It is only necessary to use sufficient pressure to ensure intimate contact between the substrates or surfaces to be bonded.

The time required to achieve solvent removal and curing will vary depending on the copolymer and cross-linking agent concentrations, the thickness of the applied adhesive and the thicknesses of the substrates to be bonded. Generally, when employing adhesives according to the preferred embodiment given above, heating times of from 2.5 to 5 minutes at 400° F., is usually sufficient. It should be noted, however, that the rate of drying and curing does not affect the ultimate bond strength.

The following are illustrative examples of the present invention. These examples are not intended to be limitative of the scope of the present invention which is limited only by the appended claims.

EXAMPLE I

Solutions of xylene containing 5 percent 10 percent and 20 percent of an ethylene-vinyl acetate resin having the following properties were prepared:

| | |
|---|---|
| Melt index | 3.67g./10 min. |
| Density | 0.9542g./cc. |
| Vinyl Acetate content | 30.1% |

The resulting slurries were stirred on a magnetic hotplate at 50°–60 C., until the resin was completely dissolved. The solutions were cooled to less than 100° F., and 1 percent of dicumyl peroxide (based on the resin) was added to each solution and stirred until dissolved.

These adhesive compositions were employed to bond articles prepared from two resinous materials having the following compositions:

Sample 1

| | Parts |
|---|---|
| Polyethylene (Alathon 7030-duPont) | 100 |
| Carbon black (Sterling V-Cabot) | 120 |
| Polymerized trimethyldihydroquinoline (Agerite Resin D-R.T. Vanderbilt) | 0.5 |
| Cab-O-Cure 2P [2,5dimethyl-di-(t-butylperoxy) hexyne-3] | 5 |

Sample 2

| | |
|---|---|
| Polyethylene (Carbide 4141) | 30 |
| Ethylene-Propylene rubber (Enjay EPR-404, Enjay Chemical Co.) | 70 |
| Talc (Mistron-Sierra Talc Co.) | 100 |
| Polymerized 1,2-dihydro-2,2,4-trimethylquinoline (Flectol H-Monsanto) | 1 |
| $TiO_2$ | 10 |
| Zinc oxide oxide | 5 |
| Zinc stearate | 2 |
| Dicumyl peroxide | 10 |
| Sulfur | 0.16 |

Sample 1 is a linear based, black cross-linkable polyethylene resin with a cured specific gravity of approximately 1.30. Sample 2 is a rubber modified cross-linkable low density polyethylene resin. Sample 1 is a rigid product while Sample 2 is a very flexible, off-white rubberlike material.

Sample 1 was pressed into plaques of between 75 mil and 85 mil thicknesses and cross-linked according to the following procedure:

The composition was mixed in a banbury mixer and dropped onto a roll mill at a temperature of 290°–300° F. It was then sheeted out. The sheet was placed in a heated press and preformed for 3 minutes at 300° F. and cured for 5 minutes at 400° F. and at 90,000 pounds force on an 80-ram.

Sample 2 was compression molded into plaques of 75 mil and 25-mil thicknesses. The 25-mil plaques were cross-linked according to the above-described procedure. The 75-mil plaques of the second sample were merely formed at 300° F., and were not cross-linked.

All of the samples were cut into 1-inch wide strips and abraded with 80 grit sandpaper. The samples were then coated with the above adhesive compositions (as shown in the following tables) by spreading a thin film over the two surfaces to be bonded using a small spatula or similar applicator. The samples were then air dried for 15–20 minutes (unless otherwise noted in the attached tables) until the sample appeared dry and no solvent odor was apparent. The samples to be bonded according to the following tables were lapped to provide 1 sq. in. of bond area between the substrates and taped with a polyester tape to prevent any movement during the bonding process.

The samples were then bonded in an oven which had been preheated to 350° F., or 400° F., for the times given in the following tables. Except where otherwise noted, a 17-lb. weight was used to ensure intimate contact of the areas to be bonded. The samples were placed on a steel plate covered with Teflon tape and the 17-lb. weight (4-inch diameter) was placed over two sets of samples to give a pressure of 8.5 p.s.i. All weights were at oven temperature. The samples were then removed from the oven and cooled under a 4 p.s.i. weight to room tem-

TABLE I.—ETHYLENE VINYL ACETATE

| Percent Solution | Cure time (min.) | Cement bond strengths (lbs.) | | | | | |
|---|---|---|---|---|---|---|---|
| | | 75 mil Sample No. 2 [1] | 25 mil Sample No. 2 [2] | 75 mil Sample No. 2 [3] | 25 mil Sample No. 2 [4] | 75 mil Sample No. 1 [3] | 75 mil Sample No. 1 [4] |
| 5 | 1 | 5¾ | 5½ | 20 | 22 | [5]19 | [5]48 |
|  | 2½ | 5¼ | 5½ | 21 | 21½ | [5]61 | [5]66 |
|  | 5 | 5 | 5 | 20½ | 21 | [5]89 | [5]64 |
|  | 10 | 4¾ | 5½ | 18 | 21½ | [5]140, 127 | [5]81, 132 |
| 10 | 1 | 6¼ | 8½ | 24 | 24½ | 234, [5]183 | 267 |
|  | 2½ | 5½ | 7½ | 26½ | 22½ | 185 | 220 |
|  | 5 | 8 | 7¾ | 28½ | 19½ | 210 | 250 |
|  | 10 | 6¼ | 6¼ | 25½ | 23½ | 153 | 220 |
| 20 | 1 | 7¾ | 8 | 24½ | 26½ | 358 | 364 |
|  | 2½ | 7½ | 8¾ | 24½ | 22 | 96 | 147 |
|  | 5 | 7¼ | 6½ | 22½ | 23½ | 270 | [5]80 |
|  | 10 | 7¾ | 8½ | 20 | 20 | 310 | 276 |

[1] Peel strength, 350° F. cure temperature.
[2] Peel strength, 400° F.
[3] Shear strength, 350° F. cure temperature.
[4] Shear strength, 400° F.
[5] Bond failure in shear.

perature, except in those tests indicated in the table run to study the effect of the weights on the bond attained.

The bonds were then tested for shear strengths and peel strengths according to the following procedure:

An Instron tensile tester Model TCC-M2 of the constant rate-of-cross-head movement type was employed to test the shear strengths and peel strengths. Shear bond strengths were obtained at 20 inches per minute. The peel strengths were obtained at a crosshead speed of 12 inches per minute to attain the standard conditions of 6 inches of peel per minute.

Table 1 shows the results of testing the bond strengths of the adhesives described above. The shear and peel strengths are in pounds per inch of width. The polymeric samples referred to above are listed in the table as Nos. 1 and 2 respectively and their thicknesses given in mils.

It should be noted from table 1 that the 5 percent cement solutions broke in the bond area, i.e., in the bond itself, for the most part in the shear samples. In all other shear tests with the higher solids content solutions, the break was obtained in the material itself and not in the adhesive.

The peel strengths also show the advantage of the 10 percent solutions over the 5 percent solutions. Furthermore, although good results are obtained employing the 20 percent solutions, several problems arise with respect to their application due to their high viscosities. It is apparent, therefore, from table 1 that optimum bonds are obtained employing 10-15 percent solutions.

Table II shows the effect of slight and great clamping forces or pressure during the bonding step on the ultimate bond strengths. The adhesive composition employed is identical to the 10 percent solution described in example 1 above and the polymeric samples bonded were the 75 mil. No. 2 samples described in example 1.

TABLE V.—BOND STRENGTHS (LBS.)

| | Ethylene-vinyl acetate cement | | | |
|---|---|---|---|---|
| | Peel | | Shear | |
| | 75 mil Sample No. 2 | 25 mil Sample No. 2 | 75 mil Sample No. 2 | 25 mil Sample No. 2 |
| Time | Test temperatures | | | |
| Cure a ........ Conditioning | 120° F. | 180° F. | 180° F. | 180° F. |
| 10 minutes ..... 7 minutes ..... | 10.8 | 2.3 | 10.0 | 10.0 |
| | Microcrystalline wax based cement | | | |
| 10 minutes ..... 7 minutes ..... | 7.2 | 0.9 | 7.5 | 7.5 | a Cured at 350° F. and 8.5 p.s.i.

TABLE VI.—BOND STRENGTHS (LBS.)

| | | Peel | |
|---|---|---|---|
| | | 75 mil Sample No. 2 | 25 mil Sample No. 2 |
| | Cure time, min.a | Conditioning Time, Min.b | |
| Cement type | | 7 | 15 |
| Ethylene-vinyl acetate ........ | 5 | 6.3 | 5.9 |
| Microcrystalline wax based ... | 5 | 2.1 | 1.8 | a At 400° F. and 8.5 p.s.i.
b At 180° F.

As is apparent, the pressure employed is not significantly critical. It is only necessary to use sufficient pressure to ensure intimate contact of the substrates to be bonded.

Table III exemplifies the results of drying rates.

TABLE II.—EFFECT OF DIFFERENT BONDING WEIGHTS ON PEEL AND SHEAR STRENGTHS

| Percent solution | Cure temp., ° F. | Cure time (min.) | Weight shear strength | |
|---|---|---|---|---|
| | | | P.s.i. | Lbs. |
| 10 ......... | 350 | 5 | 0.15 | 21 |
| 10 ......... | 350 | 5 | 1.75 | 23 |
| 10 ......... | 350 | 5 | 8.5 | 28½ |

| | | | Peel strength | |
|---|---|---|---|---|
| 10 ......... | 350 | 5 | 0.15 | 6¼ |
| 10 ......... | 350 | 5 | 1.75 | 6¾ |
| 10 ......... | 350 | 5 | 8.5 | 8 |

As is apparent from table III when compared with table II, the rate of drying does not affect bond strength. As noted above, however, the time required to bond in a particular application will largely depend on heat transfer to the cement layer through the substrates. Thicker substrates will require longer cure times than those shown herein.

Table IV shows the effect on bond strengths where the bond areas are coated twice with the adhesive.

As is evident from table IV, double coating the samples with the adhesive of the present invention does not materially improve the bond strength.

TABLE III.—EFFECT ON FAST DRYING SOLVENT FROM CEMENT

Sample No. 2: Oven Dried (5 min. at 150° F.)

| Percent solution | Cure temp. (° F.) | Cure time (min.) | Shear strength (lbs.) |
|---|---|---|---|
| 10 ......... | 350 | 5 | 23 |

| | | | Peel strength (lbs.) |
|---|---|---|---|
| 10 ......... | 350 | 5 | 8¾ |

Sample No. 1: Oven Dried (5 min. at 150° F.)

| | | | Shear strength (lbs.) |
|---|---|---|---|
| 10 ......... | 350 | 5 | 160 |

EXAMPLE II

The high temperature shear and peel strengths of an adhesive of the present invention containing the 10 percent ethylene-vinyl acetate resin solution of example I and 1 percent dicumyl peroxide were compared with an adhesive containing the same resin and 60 percent by weight of ULTRA FLEX WHITE (a microcrystalline wax). The resinous material described in Sample II of example I was utilized to evaluate to compare these two adhesives.

The wax containing adhesive was prepared by blending the ethylene-vinyl acetate resin into the molten microcrystalline wax. The components were heated and constantly stirred until all of the resin had been added to the formulation and had melted. It was necessary to increase the melt temperature during blending from 170° to 370° F. so that the melt viscosity could be maintained at a reasonably low level. The wax-resin adhesive was poured into a shallow Teflon-coated pan and allowed to cool and solidify. Pieces were cut off of the resulting slab and melted in a beaker as needed during the preparation of the samples.

The adhesive of the present invention was applied to the samples as described in example I. The coatings were allowed to air dry until the samples appeared dry and no solvent odor was apparent. The wax-resin adhesive was applied to the substrate with a spatula to give a thin even coating. In this case, the samples to be bonded were placed in contact before the cement cooled. The samples using both adhesives were coated so as to give a bond area of 1 sq. in. and the substrates were taped together with polyester tape to prevent movement during the bonding and curing operations. Curing conditions and peel and shear strengths are given in tables V and VI.

The samples were tested according to the procedure of example I except that the Model TTC-M2 Instron tensile tester was fitted with an Instron Model A74-36 environmental test chamber. This modification allowed the data in tables V and VI to be obtained at elevated temperatures.

TABLE IV.—EFFECT OF COATING BOND AREAS WITH XL CEMENT

Sample No. 1 Coated Twice

| Percent solution | Cure temp. (° F.) | Cure time (min.) | Shear strength (lbs.) |
| --- | --- | --- | --- |
| 5 | 350 | 5 | [1] 169, 119 |
| 10 | 350 | 5 | 318 |
| 20 | 350 | 5 | 346 |

[1] Bond failure.

As can be seen from table V, the peel and shear characteristic of the resin cement were greater than those exhibited by the wax-resin cement. Moreover, the peel strength data shows that the resin-based cement did not decrease in peel strength as fast as the wax-resin-based cement when subjected to increased temperatures.

Table VI shows a larger rate of decrease in peel strength of the wax-resin cement as compared to the resin-based cement when both are subjected to longer conditioning periods.

When comparing the data of Tables V and VI, it is noted that cure conditions of 400° F. for 5 minutes resulted in a greater bond strength than curing conditions of 350° F. for 10 minutes in both forms of the adhesive. However, the resin-based cement showed the greatest degree of bond strength increase. Thus, the present invention provides bonds with improved strength and high temperature performance when compared with a wax-resin-based cement.

The percentages expressed throughout the specification and claims are by weight unless otherwise indicated.

We claim:

1. A method of adhesively bonding a first member composed of a cross-linked polyolefinic material and having a surface to a second member selected from the group consisting of cross-linked polyolefinic materials, noncross-linked polymeric materials, cross-linked nonolefinic polymeric materials and nonpolymeric materials and having a surface, comprising coating at least one of the surfaces to be bonded with an adhesive comprising an organic solvent for ethylene-vinyl acetate copolymers, from about 10 to about 20 weight percent, based on solvent content, of an ethylene-vinyl acetate copolymer containing from about 29 to about 40 weight percent vinyl acetate, having a melt index of less than about 5.0 g./10 min. and having a density between about 0.95 and 0.98 g./cc., and from about 0.75 to about 2.0 weight percent of an organic peroxide cross-linking agent, drying the coatings at ambient temperatures to a nontacky condition, contacting the surfaces to be bonded under sufficient pressure to insure intimate contact therebetween and heating the coatings to a temperature between about 300° and 400° F. for a time sufficient to drive off said solvent and cure said coating to an adhesive bond.

2. The method of claim 1 wherein said cross-linking agent is selected from the group consisting of:
2,5-Dimethyl-2,5-bis(t-butylperoxy) hexane,
Dicumyl peroxide,
2,5-Dimethyl 2,5-bis(t-butylperoxy) hexyne-3,
2,5-Dimethyl-2,5-bis(isopropoxycarbonyl-peroxy)hexyne-3
bis(t-butylperoxy diphenyl silane, and
2,5-Dimethyl-di(t-butylperoxy) hexyne-3.

3. The method of claim 1 wherein said cross-linking agent is dicumyl peroxide.

4. The method of claim 1 wherein said cross-linking agent is 2,5-dimethyl-di(t-butylperoxy) hexyne-3.

* * * * *